United States Patent [19]

Wada et al.

[11] Patent Number: 4,505,252

[45] Date of Patent: Mar. 19, 1985

[54] HOLLOW DISHES WITH MELTABLE CORES AND METHOD OF MAKING SUCH DISHES

[75] Inventors: Takashi Wada; Masaru Wada, both of Tsubame; Toshi Matsu, Tokyo, all of Japan

[73] Assignee: American Hospital Supply Corporation, Evanston, Ill.

[21] Appl. No.: 530,816

[22] Filed: Sep. 9, 1983

[51] Int. Cl.³ .............................................. A47G 23/04
[52] U.S. Cl. ..................................... 126/246; 126/375
[58] Field of Search ........................ 126/375, 246, 400; 220/3.1; 99/447, 483; 206/524.8; 165/185; 219/430, 439; 208/20

[56] References Cited

U.S. PATENT DOCUMENTS

| | | | |
|---|---|---|---|
| 3,148,676 | 9/1964 | Truog et al. | 126/375 X |
| 3,557,774 | 1/1971 | Kreis | 126/246 |
| 4,246,884 | 1/1981 | Vandas | 126/375 X |

FOREIGN PATENT DOCUMENTS

WO79/2563  6/1979  PCT Int'l Appl. ................. 126/375

*Primary Examiner*—Randall L. Green
*Attorney, Agent, or Firm*—Patrick F. Bright; Donald L. Barbeau

[57] ABSTRACT

A hollow dish with a discrete, meltable core such as a wax core includes top and bottom members welded to one another at their periphery, and a meltable, preferably wax core confined within an oxygen-free, water-free cavity between the top and bottom members. A method for making a hollow dish with such a core includes liquifying a meltable substance such as wax in an oxygen-free, water-free, inert atmosphere; cooling and solidifying the meltable substance to form a meltable core; placing the meltable wax core in the cavity inside a hollow dish; removing all oxygen and water from the core-containing cavity inside the hollow dish; and sealing the hollow dish to preclude escape of the wax core from the cavity and to preclude oxygen and water from entering the cavity.

9 Claims, 9 Drawing Figures

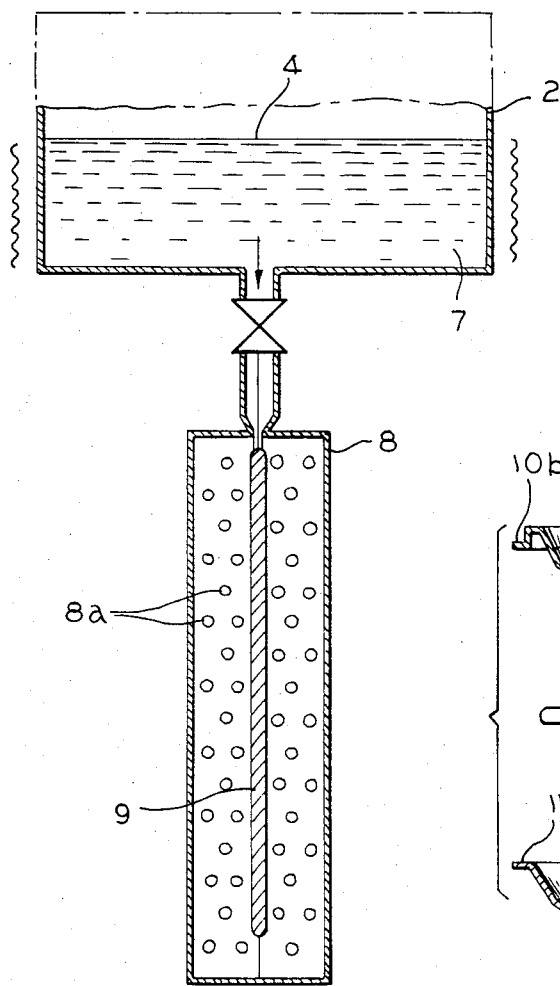
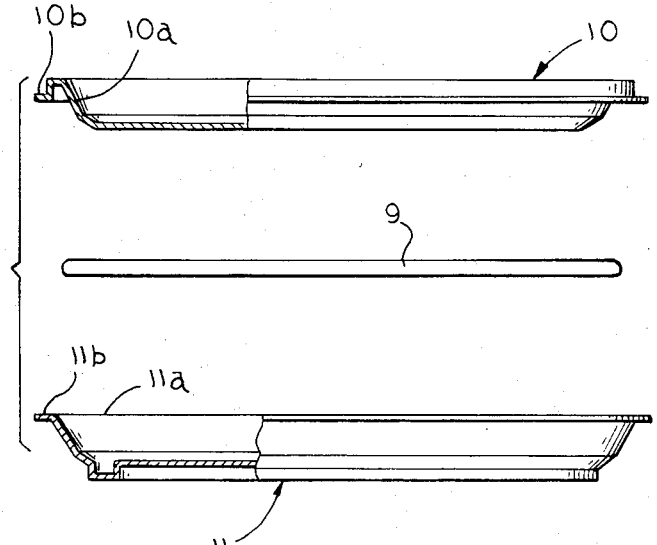
FIG. 4D
FIG. 4E
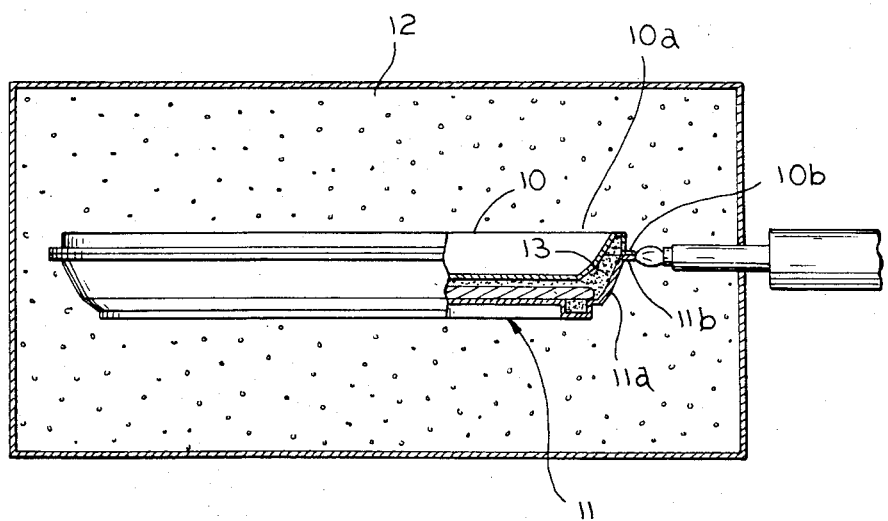
FIG. 4F

" "

HOLLOW DISHES WITH MELTABLE CORES AND METHOD OF MAKING SUCH DISHES

BACKGROUND OF THE INVENTION

This invention relates to hollow dishes, preferably hollow metal and plastic dishes such as plates, having discrete, meltable cores, preferably wax cores, sealed within an oxygen- and water-free cavity inside the hollow dishes. This invention also relates to a method of making such hollow dishes.

Our new hollow dishes with discrete, meltable cores, preferably wax cores, preferably include a top member, a complementary bottom member, and means at the peripheries of each for joining them to one another at their peripheries to form a hollow cavity between them. The hollow cavity so formed is substantially impermeable to water and air or other oxygen-containing gases. As a result, the meltable core inside the sealed cavity is insulated from oxidation, water damage and other kinds of degradation.

Our method for making the new hollow dishes with discrete, meltable cores, preferably wax cores, comprises liquifying a meltable substance such as wax in an oxygen-free, inert atmosphere; cooling and solidifying the meltable substance to form a solid, meltable core for such dishes; placing the solid meltable core inside the hollow dish; removing or otherwise excluding substantially all oxygen from the core-containing cavity inside the hollow dish; and sealing the core inside the hollow dish. Such sealing precludes escape of the meltable core from its cavity, and prevents air, oxygen-containing gases, water and other contaminants from entering the cavity and attacking the core.

In the preferred embodiment of our new hollow dishes, the hollow dishes include two members, preferably made of a metal such as stainless steel. The upper member and lower member are complementary in size and shape, and include means for sealing them to one another (preferably at their peripheries) to form a hollow, sealed cavity between them. Alternatively, the hollow dish may be of one-piece or other construction or of other materials such as thermoplastic and thermoset materials. Such dishes must includes means (such as a filling hole) for placing a meltable core substance inside them. Though our invention relates to dishes of many different sizes, e.g., round, elliptical, square, our preferred embodiment is a plate, especially a round or square metal plate.

The meltable core is preferably made of an asphalt substance, or a wax with high specific heat and a melting point in the range of about 180° F. to about 215° F., such as synthetic, hardened microcrystalline wax, carnauba wax, Cornowax or slack wax. Such substances store a large quantity of heat energy that is gradually released at a rate slower than the rate at which the heat was stored. When molding the wax to a shape suitable for insertion into the core of a hollow dish such as a plate, our process calls for melting, then solidifying the wax in an appropriately shaped mold or die while excluding air, other oxygen-containing gases, water, and other contaminants from the core.

Our new hollow dishes with meltable cores and our methods for making such dishes can better be understood by reference to the drawings accompanying this application.

FIG. 4D is a schematic view of the liquefied wax of FIG. 4C being injected into a die;

FIG. 4E is an exploded schematic view of a solidified wax core being deposited in the hollow dish of the present invention; and FIG. 4F is a schematic view of the hollow dish components of the present invention being joined.

DESCRIPTION OF THE PREFERRED EMBODIMENT

Figure 1:
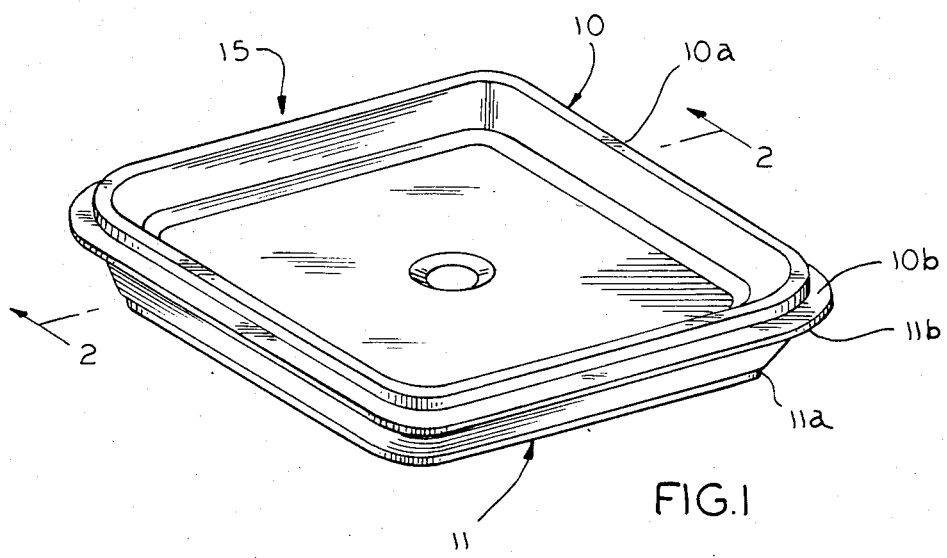
FIG. 1 is a perspective view of a round, hollow plate made of stainless steel and including complementary top and bottom members joined to one another at their peripheries to form a sealed, hollow cavity between them.
Figure 2:
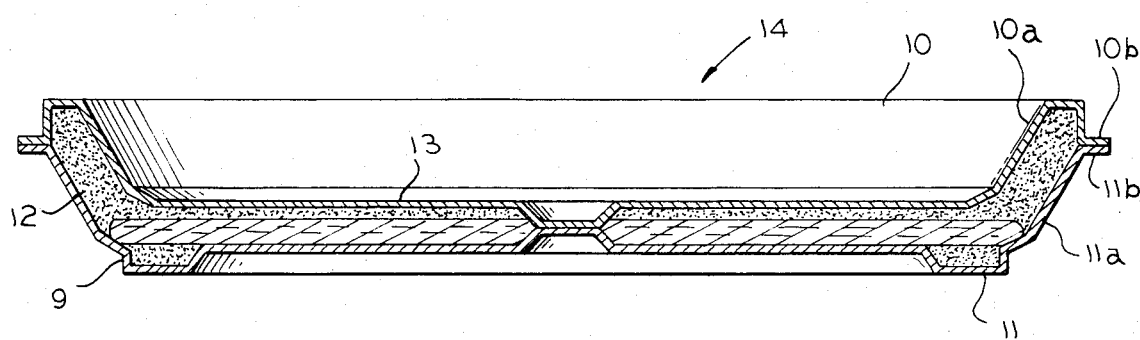
FIG. 2 is a sectional view of the hollow plate shown in FIG. 1, showing a solid, meltable wax core in the cavity inside the hollow plate and the structural features of the plate itself.
Figure 3:
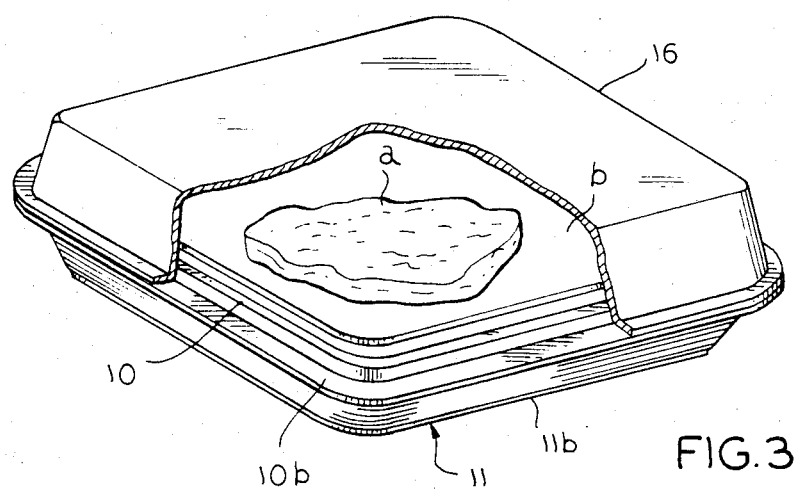
FIG. 3 is a perspective view of the hollow plate shown in FIGS. 1 and 2, with a cover over the plate, and with a portion of the cover and the top member of the plate broken away to show details of the plate, the hollow cavity inside the plate and the meltable core inside the cavity.

FIGS. 1, 2 and 3 show hollow, stainless steel plate 15 including upper plate member 10 and lower plate member 11. Members 10 and 11 are joined, by welding or otherwise, at their edges 10b and 11b, respectively, forming an airtight, waterproof cavity 13 in the space between the top and bottom members. Cavity 13 contains meltable, solid wax core 9, together with nitrogen or other inert gas 12. (Cavity 13 contains substantially no air, no other oxygen-containing gas, and no water.)

The core 9 stores heat when the plate is initially heated and then releases the stored heat through top member 10 for an extended period of time as the plate cools. The heat-storing material comprising the core is preferably a synthetic petroleum wax material having a specific heat of at least 0.5 BTU, a heat of fusion of at least 50 calories/gram and a melting temperature in the range between 185° F. and about 200° F. The material should also be non-toxic. When the core material is heated above its melting temperature, a relatively large amount of heat, i.e., heat of fusion, is stored therein as the heat-storing material melts from its solid state to its liquid state. Thereafter, when the heat-storing material cools, the material undergoes a phase change from the liquid state to the solid state, and the heat energy stored in the material is gradually released at a rate which is much less than the rate at which it was stored. Thus, a substantial amount of heat is available for release to the dishware to keep the food thereon warm for a relatively long period of time, i.e., in excess of 30 minutes.

Figure 4A:
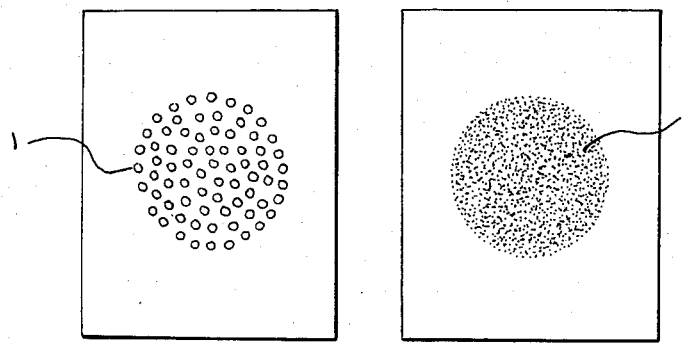
FIG. 4A is a schematic view of a wax in powder or particulate form in accordance with the present invention.

Our preferred method for making our new hollow dishes appears in FIG. 4, which includes views A through F. View A shows a synthetic wax such as hydrocarbon wax in powder or particulate form. An example of a suitable wax is FDA wax 175.250, 172,615. This wax has an average molecular weight of 680; a carbon content of 85.4% by weight; a hydrogen content of 14.6% by weight; a congealing point of 95.5° C.; a density of 0.94 grams per cubic centimeter at 25° C.; and a specific heat of 1.93 joules per gram at 20° C.; 2.52 joules per gram at 50° C.; and 2.59 joules per gram at 130° C. Other suitable waxes include microwaxes corresponding to FDA 172,886, and FDA 178.3710; 130 paraffin wax, corresponding to FDA 172,886 or FDA 178.3710; and slack wax.

Figure 4B:
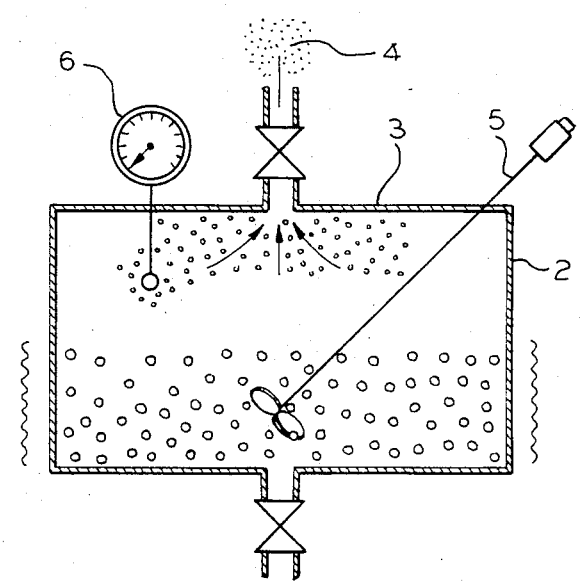
FIG. 4B is a schematic view of the wax shown in FIG. 4A in an agitating chamber.

FIG. 4B shows powder or particulate wax 1 deposited in container 2. Nitrogen gas 4 blankets wax 1, and prevents air and other oxygen-containing gases from entering container 2. Nitrogen gas is particularly suitable for this purpose because it is heavier than, and readily displaces air with high efficiency. Agitator 5 assists in expelling air and other oxygen-containing gases from wax 1, and speeds formation of a homogenous, melted wax composition in container 2. Detector 6 monitors the gases in container 2 to assure that air and all other oxygen-containing gases are excluded.

Figure 4C:
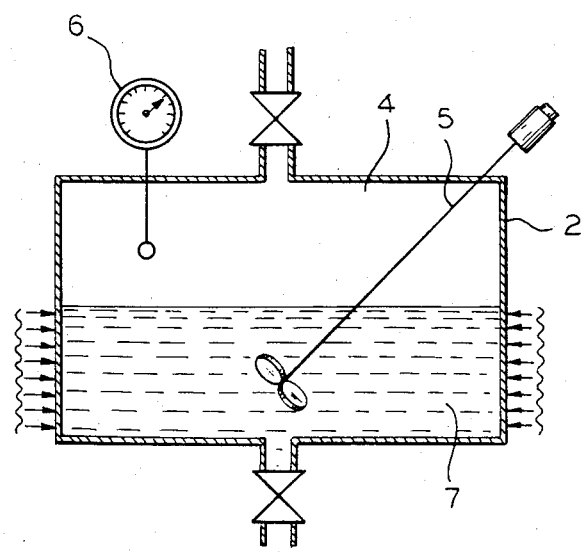
FIG. 4C is a schematic view of a liquefied wax in an agitating chamber.

FIG. 4D shows the injection of liquified wax from FIG. 4C into male and female dies 8. In dies 8, the wax cools and changes from the liquid state (shown in container 2) to the solid core 9. Openings 8a in dies 8 permit flow through the dies of cooling water to lower the temperature and to speed solidification of the wax.

FIG. 4E shows depositing meltable wax core 9 into cavity 13 between top plate member 10 and bottom plate member 11.

FIG. 4F shows the joining of top plate member 10 to bottom plate member 11 at their peripheral rim portions 10b and 11b, respectively, by welding or otherwise. During welding, the space in cavity 13 between top and bottom members 10 and 11 that is not occupied by the meltable core is filled with nitrogen or other inert gas to prevent degeneration or degradation of the core by oxygen, water or otherwise. Heliarc and seamless welding are the preferred methods for joining the top and bottom members to one another at their peripheries. Control of the welding process is required to insure complete exclusion of air and other contaminants from cavity 13. The result is hollow, stainless steel plate warmer 14 with meltable wax core 9 deposited in airtight, waterproof cavity 13 formed between the top plate member 10 and the bottom plate member 11. The balance of the cavity contains nitrogen or other inert gas 12 to prevent degradation of the wax core by oxygen, water, or both.

In use, plate warmer 14, and its core are heated to a temperature of about 120° C. At this temperature, the wax melts, and serves as a heat sink for delivering heat to items placed atop plate warmer 14. Insulated dome 16 may be positioned over items such as food placed atop plate warmer 14 for keeping those items warm.

Our new hollow plates have several advantages. First, because neither the meltable core nor the cavity containing the meltable core contains air, other oxygen-containing gases or water, oxidation and other kinds of degradation of the core are substantially prevented. Secondly, because the meltable core can be made of a lightweight substance such as wax, our hollow plates are lightweight and easy to handle. Third, the waxes used in the preferred embodiments of our new plates are low in cost. Fourth, because core degradation takes place at more predictable rates than prior art dishes of this general type, the useful life of our new dishes is correspondingly more predictable.

What is claimed is:

1. A method for making a hollow dish having a core containing cavity and with a discrete, meltable core substance comprising: liquefying said meltable substance in a substantially oxygen-free inert atmosphere to prevent degradation of said meltable core; cooling and solidifying said meltable substance in said inert atmosphere to form a meltable core for said dish; placing the solidified meltable core substance inside said hollow dish core containing cavity; removing substantially all oxygen and water from said core-containing cavity inside said hollow dish; filling the space of said hollow dish core containing cavity not occupied by said meltable core with an inert atmosphere to prevent degradation of said meltable core; and sealing said hollow dish to preclude escape of said meltable core substance and inert atmosphere from said cavity and to substantially preclude oxygen and water from entering said cavity.

2. The method of claim 1 wherein said hollow dish includes a top member, a complementary bottom member, and means at the periphery of said top and bottom members to permit joining said top and bottom members to one another solely at their peripheries.

3. The method of claim 2 wherein said top member and said bottom member are made of a metal, a thermoset plastic or a thermoplastic.

4. The method of claim 1 wherein said meltable core substance is a wax with high specific heat and a melting point in the range of about 185° F. to about 215° F.

5. The method of claim 4 wherein said wax is selected from the group consisting of slack wax, carnauba wax, Cornowax, microcrystalline wax and paraffin wax.

6. The method of claim 1 wherein the inert atmosphere is nitrogen.

7. A hollow dish comprising: a top member, a complementary bottom member joined to said top member at the periphery of said bottom and said top member defining a hollow, sealed cavity between said bottom and said top member; a meltable core substance within said cavity, said core and said cavity substantially free of oxygen and water; and an inert atmosphere occupying a portion of said cavity not occupied by said core.

8. The dish of claim 7 wherein said meltable substance is a wax with high specific heat and a melting point in the range of about 185° F. to about 215° F.

9. The hollow dish of claim 8 wherein said meltable wax is selected from the group consisting of carnauba wax, Cornowax, paraffin was and slack wax.

* * * * *